United States Patent [19]

De Jager

[11] 4,031,726
[45] June 28, 1977

[54] AIRCRAFT ANTI-THEFT CHOCK DEVICE

[76] Inventor: Garry De Jager, 6660 Riverside Drive, Chino, Calif. 91710

[22] Filed: Mar. 19, 1976

[21] Appl. No.: 668,435

[52] U.S. Cl. .................................. 70/226; 70/259; 188/32
[51] Int. Cl.² ...................... B60F 3/00; B60T 3/00
[58] Field of Search ............ 70/234, 259, 260, 226; 280/150 R; 188/32, 4 R, 36; 301/37 AT

[56] References Cited

UNITED STATES PATENTS

| 3,120,292 | 2/1964 | Rambat | 188/32 |
| 3,581,846 | 6/1971 | Janus | 70/225 |
| 3,907,072 | 9/1975 | Shafer | 70/226 X |

FOREIGN PATENTS OR APPLICATIONS

| 660,032 | 2/1965 | Belgium | 188/32 |
| 93,730 | 2/1959 | Norway | 70/259 |

Primary Examiner—J. Franklin Foss
Attorney, Agent, or Firm—Boniard I. Brown

[57] ABSTRACT

An aircraft anti-theft device arranged to be releasably locked to an aircraft wheel whereby the wheel is prevented from rotating, the device comprising a bifurcated chock base member having a substantially U-shaped frame structure adapted to be positioned about the lower portion of an aircraft wheel, wherein the chock is adapted to be locked directly to the brake drum of the wheel by various locking and latching members, which vary upon the particular design of the aircraft wheel.

14 Claims, 17 Drawing Figures

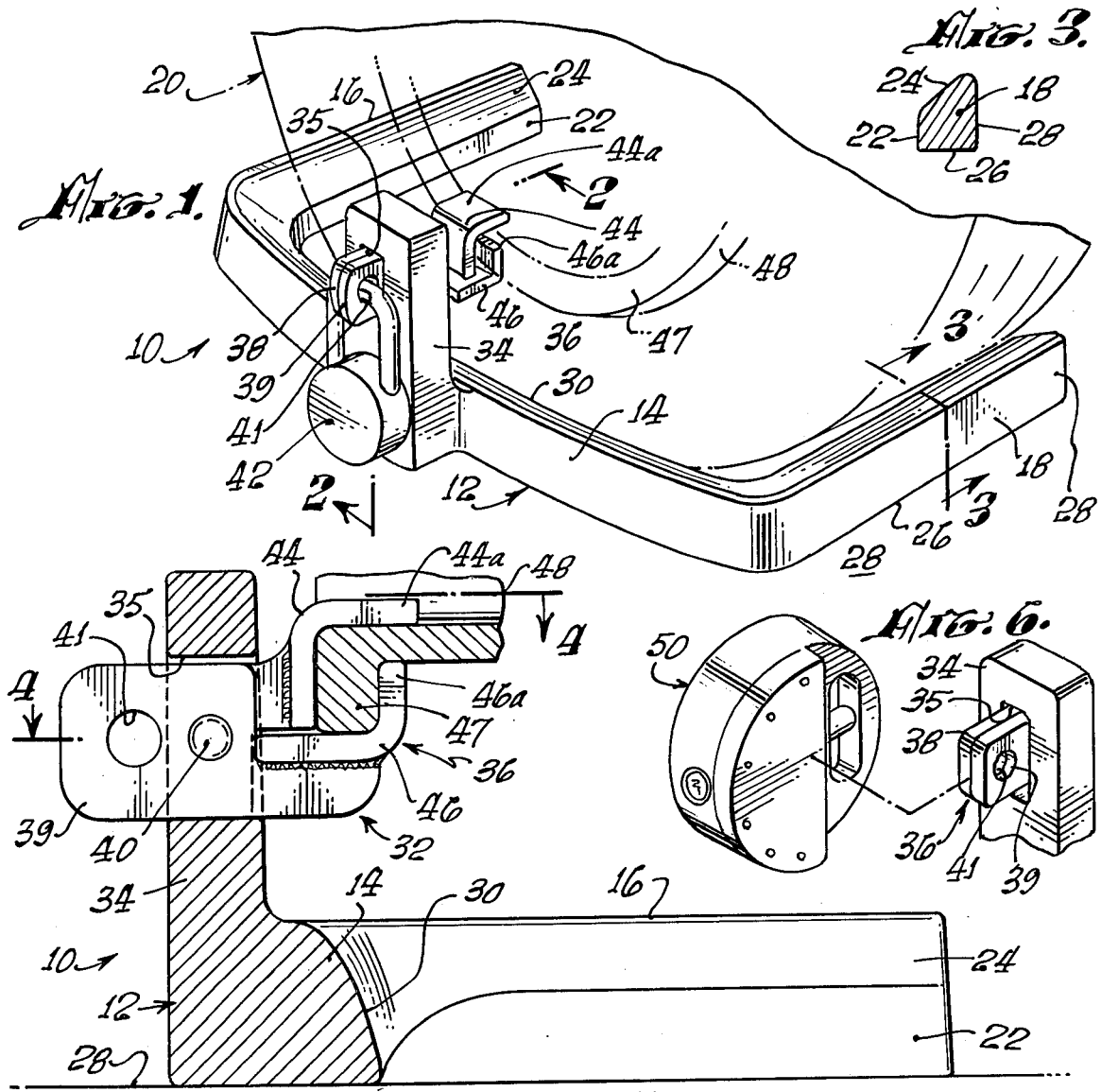
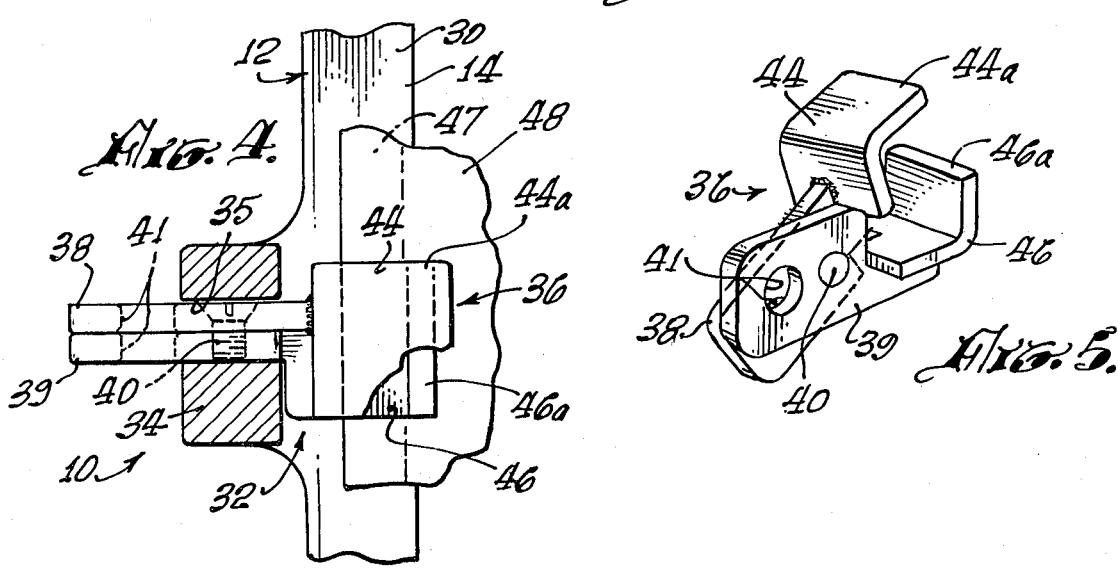

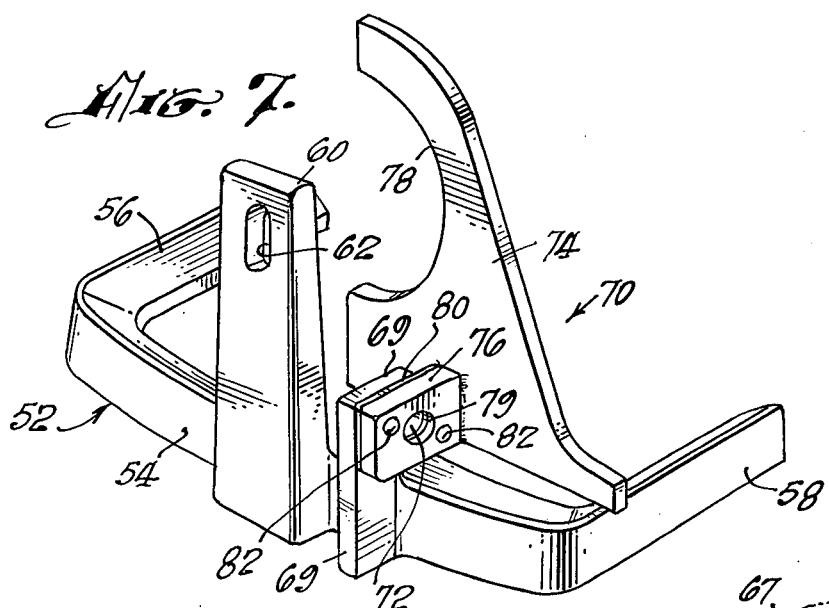
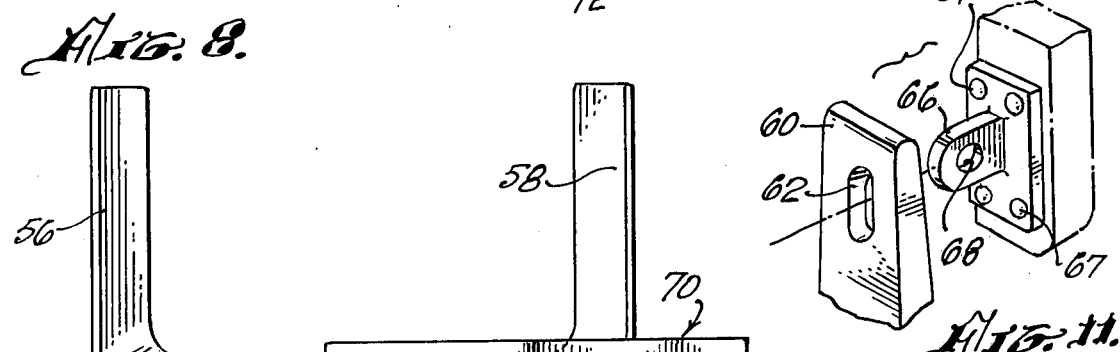
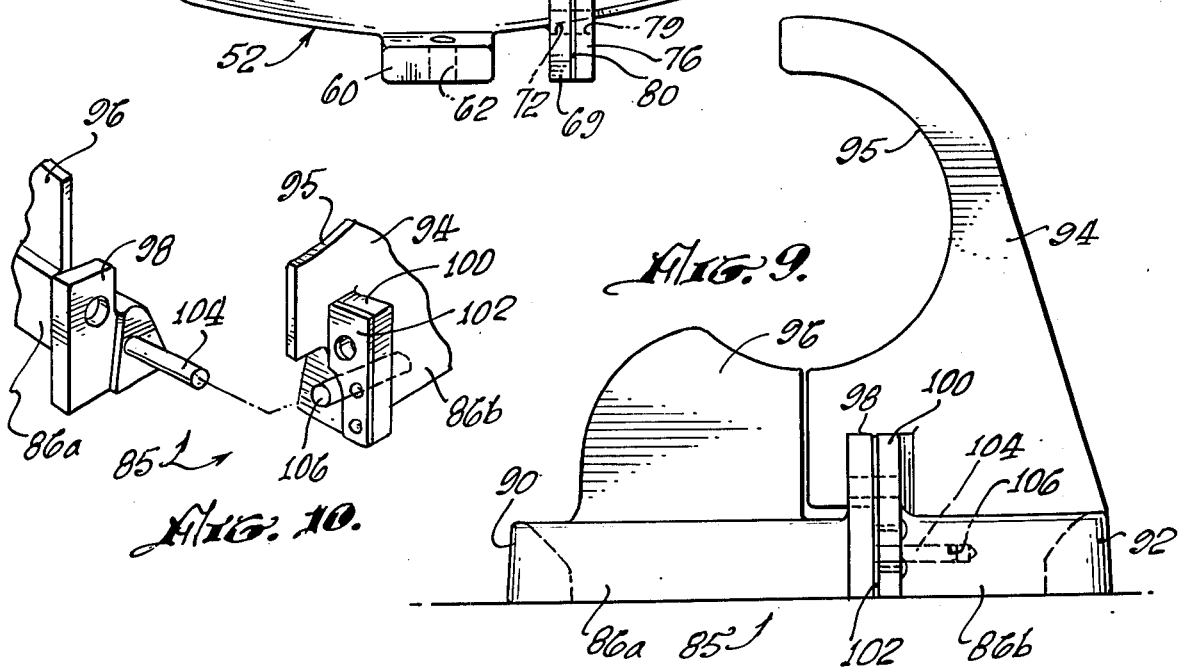

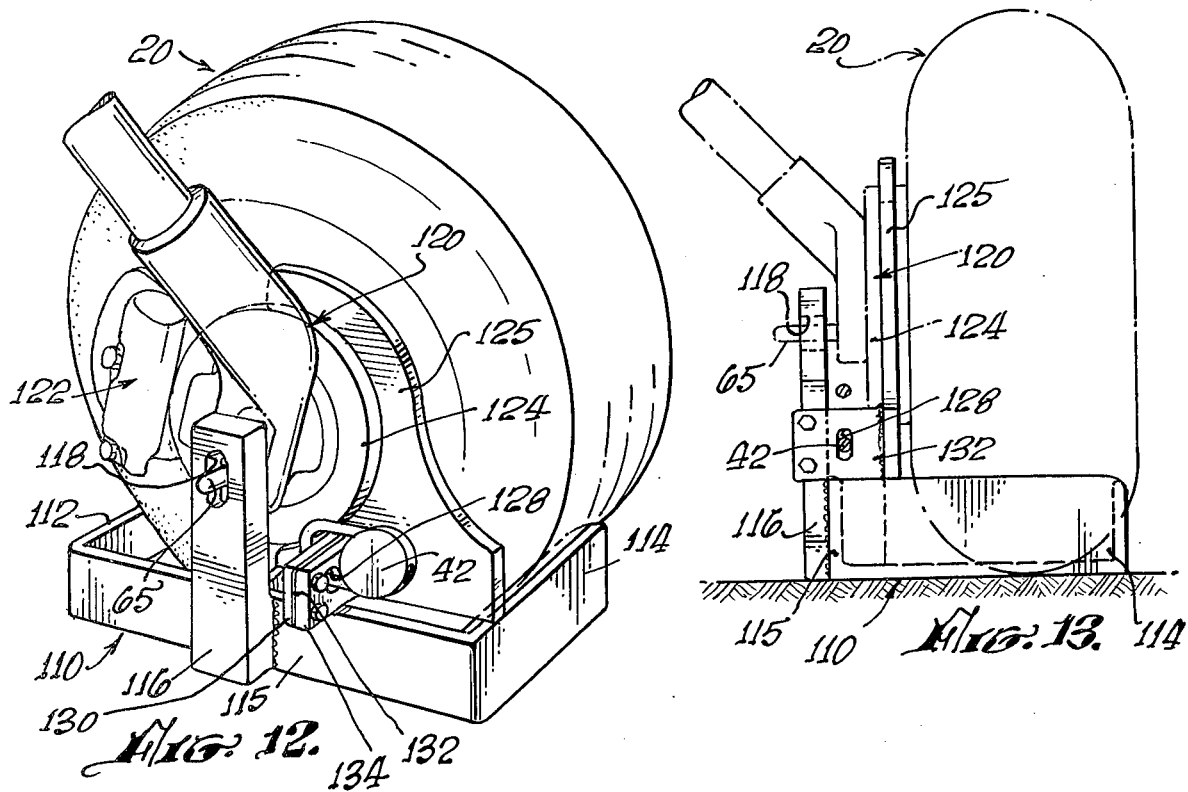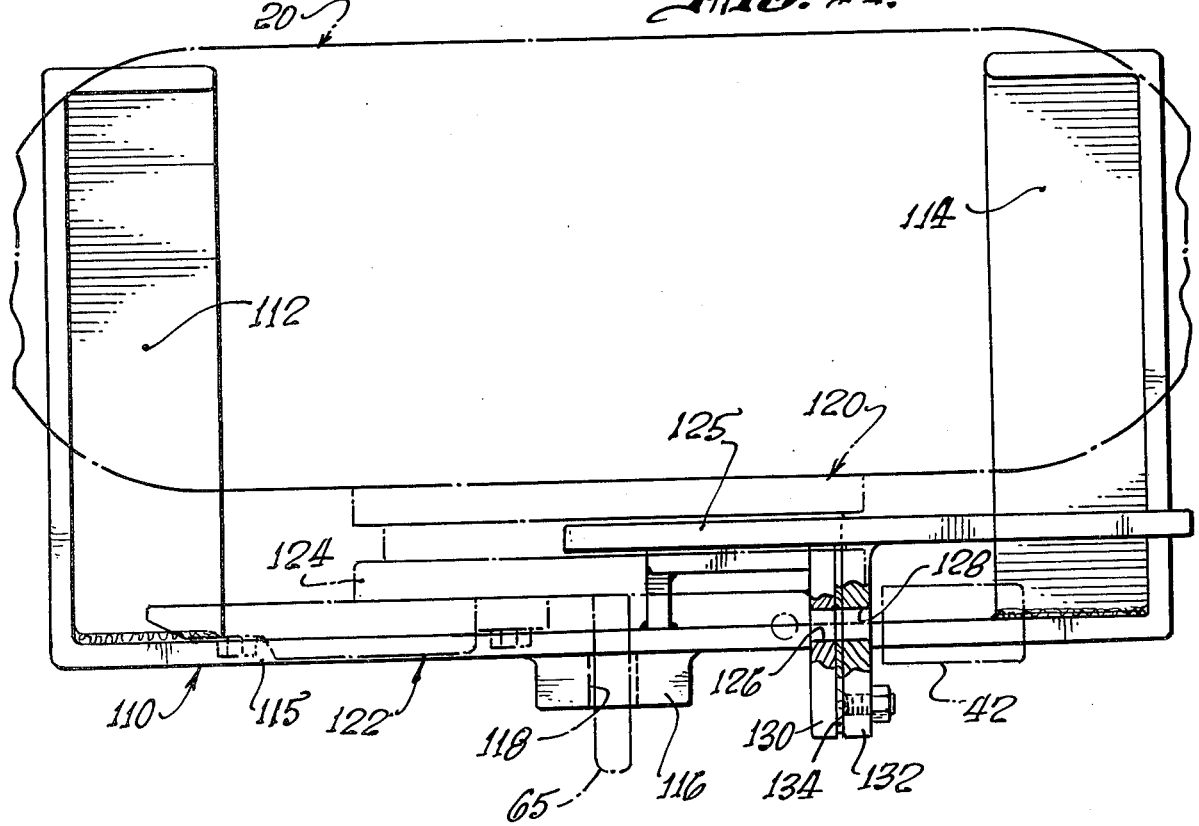

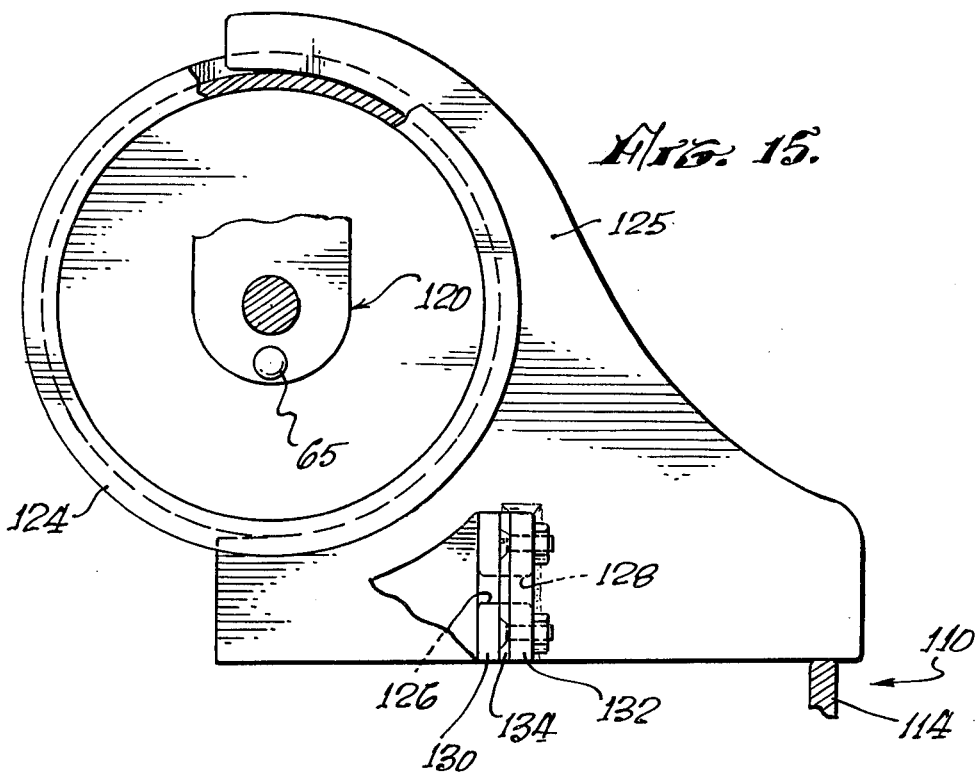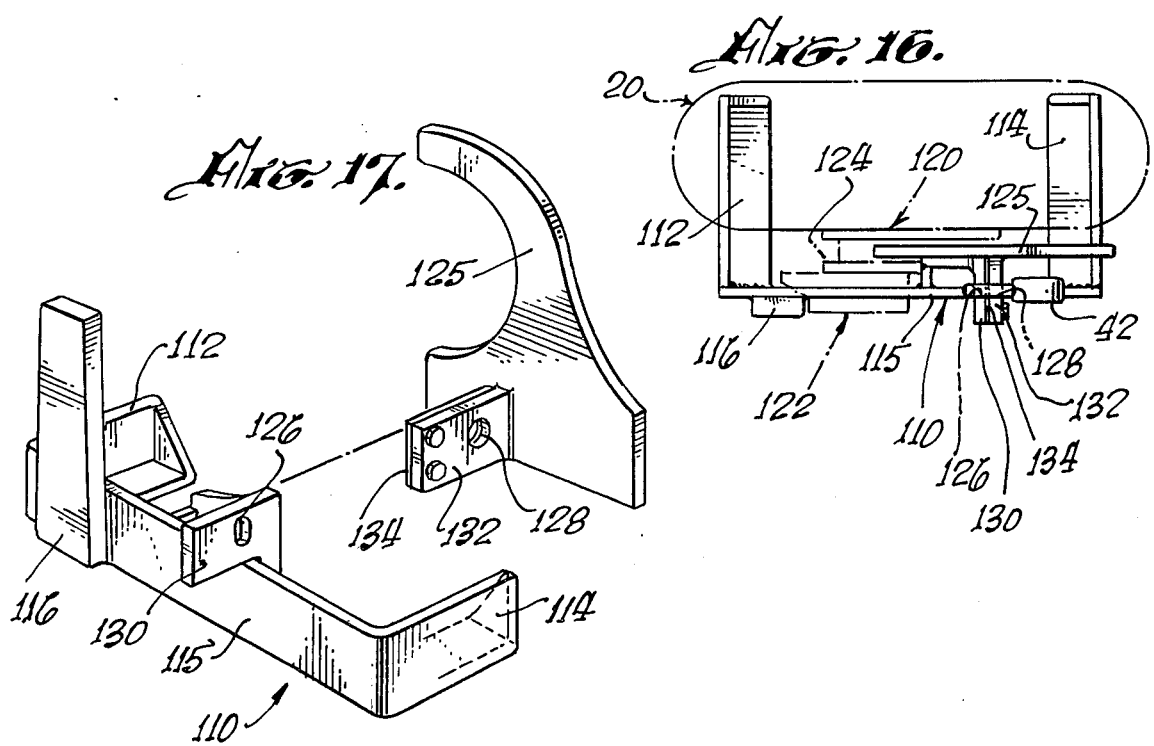

AIRCRAFT ANTI-THEFT CHOCK DEVICE

BACKGROUND OF THE INVENTION

1. Field of the Invention

This invention relates to an anti-theft device for aircraft and, more particularly, to an anti-theft device formed as a wheel chock adapted to be locked to various wheel components, thereby preventing rotation of the wheel in the simplest manner possible.

2. Description of the Prior Art

As is well known in the aircraft industry, various problems and difficulties are encountered in providing suitable means for protecting the non-commercial type of aircraft from being stolen.

Several types of devices have been employed to protect these aircraft from unauthorized use. However, when dealing with what is known as the "professional" thief, a satisfactory device is yet to be made available as a positive anti-theft device against such thefts.

Thefts of parked airplanes from airport aprons and parking areas within an airport is widespread. Expert thieves have little or no problem getting aircraft started without the use of keys, etc. It has become a very serious problem, particularly along cities and towns which are located near foreign borders, such as found between the Stare of California and the country of Mexico.

Thus, aircraft of the two, four and six passenger type, particularly Centurion 210, Cessna 200 and Cherokee 6, are time and again found to be the particular choices of thieves.

Accordingly, the present invention as herein described is so designed as to provide an answer to the above and will show how such problems have been overcome.

SUMMARY OF THE INVENTION

The present invention comprises an aircraft anti-theft chock device, whereby the average two, four and six passenger airplane can be safely parked along large parking areas of airports, and the like, without the fear of being stolen. The chock device as herein disclosed includes a bifurcated chock base member having a generally U-shaped configuration whereby the projecting arms thereof are positioned forward and aft of the aircraft landing wheel, wherein the arms are wedged between the tire of the wheel and the ground surface of the parking area.

Several embodiments are herein shown wherein various types of locking devices are incorporated to co-act with the basic chock member. These locking devices include a vertical bar member that is adapted to receive a locking clamp which is attached directly to the brake drum hub; and a second unit is disclosed having a vertical bar member arranged to receive a landing-gear pin in a fixed position, and also includes a detachable locking plate to engage the drum by means of a semi-circular notch disposed in the locking plate, the plate being adapted to be removably secured to the base member.

Due to the variety of aircraft and the designs thereof, additional embodiments are also presented, wherein the base member is formed by mated half sections which are arranged to be secured together by any suitable well known padlock unit.

OBJECTS AND ADVANTAGES OF THE INVENTION

The present invention has for an important object a provision wherein the average well known commercial aircraft, particularly the two, four, and six passenger planes, can be prevented from being stolen by the use of an anti-theft aircraft chock means.

It is another object of the invention to provide an aircraft anti-theft chock that is so designed as to encompass at least one of the wheels of the aircraft, simply preventing it from any rotational movement.

Still another object of the present invention is to provide an aircraft anti-theft device that comprises a bifurcated chock unit having laterally extending arm members arranged to be positioned fore and aft of the tire and wedged between the tire and ground surface, and including a means whereby the chock unit is directly secured to the aircraft wheel assembly.

It is further another object of this invention to provide a device of this character that has a more positive dependable locking arrangement heretofore not possible.

It is a further object of the invention to provide a device of this character that is simple and rugged in construction.

A still further object of the invention is to provide an aircraft anti-theft device that will have a long life span, and is easy to service and maintain.

The characteristics and advantages of the invention are further sufficiently referred to in connection with the accompanying drawings, which represent one embodiment. After considering this example, skilled persons will understand that variations may be made without departing from the principles disclosed and I contemplate the employment of any structures, arrangements or modes or operation that are properly within the scope of the appended claims.

DESCRIPTION OF THE DRAWINGS

Referring more particularly to the accompanying drawings, which are for illustrative purposes only:

FIG. 1 is a perspective view of one embodiment of the present invention as positioned with respect to an aircraft wheel;

FIG. 2 is an enlarged cross-sectional view taken substantially along line 2—2 of FIG. 1 thereof;

FIG. 3 is a cross-sectional view of the extending arm member taken along line 3—3 of FIG. 1 thereof;

FIG. 4 is a cross-sectional view of the locking arrangement as taken along line 4—4 of FIG. 2 thereof;

FIG. 5 is a perspective view of the securing means;

FIG. 6 is an exploded view, illustrating a padlock device that is adapted to be attached to various securing means, as indicated in FIG. 1;

FIG. 7 is a perspective view of an alternative arrangement of the present invention wherein a locking plate is included;

FIG. 8 is a top plan view thereof;

FIG. 9 is still another embodiment of an aircraft anti-theft device wherein the chock base is arranged having two separable sections;

FIG. 10 is an exploded view illustrating the connecting arrangement between the sections as seen in FIG. 9;

FIG. 11 is an exploded perspective view showing a specific type of attachment between the chock and the wheel assembly;

FIG. 12 is a perspective view of a further arrangement of the present invention similar to that shown in FIG. 7;

FIG. 13 is a side-elevational view thereof; and

FIG. 14 is a top plan view thereof;

FIG. 15, is another side-elevational view of one of the components shown in FIG. 7;

FIG. 16 is another top plan view thereof;

FIG. 17 is a perspective view of the securing means.

DESCRIPTION OF THE PREFERRED EMBODIMENT

Referring more particularly to the drawings, there is illustrated an aircraft anit-theft device, generally indicated at 10, comprising a bifurcated chock base member 12 having a forward main body portion 14 from which two laterally extending arms 16 and 18 are integrally formed at the opposite terminating ends of said body 14. Thus, the chock base member defines a substantially U-shaped configuration whereby the main body 14 is permitted to directly abut against the side wall of the aircraft wheel, indicated generally at 20 in FIG. 1. The arms 16 and 18 are provided having a portion of their inner walls 22 inclined inwardly and upwardly, as at 24 and as seen in FIG. 3 thereof. The bottom wall 26 thereof is flat to accommodate the ground surface 28, the front wall 29 being arranged in a normal vertical manner. However, the inner wall 30 of the main body 14 is provided with a curvilinear configuration. Hence, the base member can be readily cast or manufactured by any well known suitable method.

However, the casting method is preferred wherein the unit is formed of aluminum or aluminum-magnesium alloy, thereby providing a hardened metal structure that will resist the average saw blade.

The arrangement as seen in FIGS. 1 through 5 illustrates a securing means, generally indicated at 32, which comprises a central securing bar 34 of substantial thickness integrally formed with the base member 14 in a vertically upward position. Adjacent the upper terminating end of said bar 34, there is disposed an aperture 35 therethrough in which a securing connection means is adapted to be received. The securing connection means is generally indicated at 36 and clearly is seen in FIGS. 1, and 3 through 5, wherein said securing connection means comprises a scissor-like clamp device having a pair of blades 38 and 39 swingably mounted together by pivot pin 40. The forward end of each blade is provided with holes 41 therein to accommodate the padlock 42 to be received therethrough, when the holes are aligned and the blades are projecting through aperture 35 of bar 34. The opposite ends of each blade 38 and 39 are notched out to receive jaw members 44 and 46, respectively, wherein said jaw members are affixed thereto. In this arrangement, the jaws are formed having a substantially L-shaped configuration and positioned to be oppositely arranged, as seen in the before-mentioned Figures.

Accordingly, the jaws, when in a clamping mode, are designed to receive the annular flange 47 of the brake drum 48 of the wheel assembly (see FIG. 2). Jaw 44 includes an outwardly extending horizontal lip 44a, which engages the inner area of drum 48, while jaw 46 includes a vertical lip 46a which is disposed behind the flange 47. Thus, it can be seen that lateral movement of the chock is prevented, while the rotational movement of the wheel 20 in a rearward or forward direction is impossible.

Referring to FIG. 6, there is shown a tamper-proof lock device generally indicated at 50, wherein the locking pin 52 can not be reached once said lock is in position in blades 38 and 39.

Referring now to an alternative embodiment, there is shown in FIGS. 7 and 8 a chock base, indicated generally at 52, wherein the configuration thereof is substantially the same as that hereinbefore described. That is, said base member 52 includes a main body 54, a pair of laterally extending arm members 56 and 58 respectively, and a vertical central securing bar 60 having an elongated aperture 62 disposed therethrough. In this particular design, the aperture 62 is positioned to receive a latching pin, which is found on some models of aircrafts. The pin is affixed to the wheel assembly of the aircraft and is normally used as a latching device for the wheel assembly upon being folded during flight, said pin being generally axially aligned with the wheel (see FIG. 12 for placement of pin indicated at 65).

However, if necessary, when no pin is available one can be provided as seen in FIG. 11, wherein a latching pin 66 is mounted to the assembly by rivets 67. This pin can also include a hole 68, if required.

At this point, the base 54 further includes a second vertical bar 69 forming part of the securing means, generally indicated at 70. The bar 69 is formed as an integral part of said base 54 and is positioned to one side of the central bar 60, extending upwardly from the base a sufficient distance to allow for a hole 72 to be located therein. The remaining elements of securing means 70 include an enlarged securing plate 74, which is mounted separately from the base member 54, and an extending ear member 76 integrally affixed to said plate so as to positioned adjacent said bar 69, when said chock device is secured to said wheel assembly.

The securing plate 74 is provided with a C-shaped notch 78, the radius thereof being substantially that of the brake drum of any given aircraft. The notch allows the drum to be received therein at which time ear 76 engages bar 69, said ear 76 being provided with hole 79. To prevent further tampering with the device, it is contemplated that ear 76 can be provided with a hardened metal plate 80 affixed thereto by pins 82, thereby making it almost impossible to cut through with the average cutting tool.

Another embodiment is also illustrated in FIGS. 9 and 10. This embodiment comprises a chock base, indicated generally at 85, said base being formed in two parts 86a and 86b and joinable along the main body sections 87 and 88, respectively. Thus, when the sections are joined, the C-shaped configuration is formed. Body sections 86a includes arm extension 90, and body section 86b has arm extension 92, each arm being integrally formed with respective sections.

Securing means in this embodiment comprises a securing plate 94 which extends upwardly as part of the main body 86b and includes a C-shaped notch 95, said notch being arranged to engage the wheel brake drum as previously described with respect to notch 78. Juxtapositioned with respect to plate 94 is a second securing plate 96, which extends upwardly from body 86a. This plate has a leading to arcuate edge, the radius of the arcuate edge being identical to that of the notch 95.

Accordingly, when the two sections 86a and 86b are joined, there is created an opening having more than 180°, such that when the hub is disposed therein the device 85 can not be removed therefrom, once a padlock is connected thereto. In order to allow a padlock to be secured thereto, there is also included on each section 86a and 86b laterally extending ears 98 and 100, respectively. Ear 100 is provided with a hardened steel plate 102 which is affixed thereto.

When locked or joined together, the sections must be held in place with respect to each other; and this is accomplished by providing a joining means which comprises a joining pin 104 mounted longitudinally to body 86a and projecting outwardly therefrom to be received in an aligned bore 106, as seen in FIGS. 9 and 10.

Referring now to the embodiment as shown in FIGS. 12 through 17, there is illustrated the present invention having substantially the same configuration as that described in FIGS. 7 and 8, with the exception that this embodiment is formed from welded components. That is, the chock base 110 is formed from an angle-iron member whereby the extending arms 112 and 114 are bent inwardly from the main body portion 115, thus creating a U-shaped chock 110. A central bar 116 is welded to body 115 and is positioned to receive pin 65 through aperture 118, the pin 65 being part of the overall wheel assembly 120, which also includes a disc brake assembly 122 having a brake drum 124 to which locking plate 125 is mounted thereon and held in place by padlock 42. The padlock 42 is received through holes 126 and 128 of locking ears 130 and 132, respectively. Ear 132 includes plate 134 as previously described heretofore. Ear 130 is a piece of angle-iron welded to body 115 through rib 136, and ear 132 is welded to plate 125 as seen in FIG. 14.

FIG. 16 shows the position of the vertical bar 116 which is to the left side of the base 115, wherein said bar engages the brake assembly 122, thereby preventing lateral movement of the chock 110.

The invention and its attendant advantages will be understood from the foregoing description and it will be apparent that various changes may be made in the form, construction and arrangement of the parts of the invention without departing from the spirit and scope thereof or sacrificing its material advantages, the arrangement herein before described being merely by way of example, and I do not wish to be restricted to the specific form shown or uses mentioned, except as defined in the accompanying claims.

I claim:

1. An aircraft anti-theft device in combination with an aircraft wheel assembly having a wheel thereon comprising:
    a bifurcated chock means arranged to receive the wheel of the wheel assembly between the bifurcated portion thereof and including a forward main body base member and a pair of spaced apart laterally extending arm members at opposite ends of said base member arranged to be positioned forward and aft of said wheel assembly when arranged therewith;
    securing means having a vertical securing bar formed with said base member of said bifurcated chock means; and
    securing connection means for releasable engagement between said securing bar and said wheel assembly.

2. An aircraft anti-theft device in combination with an aircraft wheel assembly having a wheel thereon comprising:
    a bifurcated chock means arranged to receive the wheel of the wheel assembly between the bifurcated portion thereof and including a forward main body base member and a pair of spaced apart laterally extending arm members at opposite ends of said base member arranged to be positioned forward and aft of said wheel assembly when arranged therewith,
    securing means having a vertical securing bar formed with said bifurcated chock means,
    securing connection means for releasable engagement between said chock means and said wheel assembly, and
    said securing bar being integrally formed to said body base member in a vertical position thereto, and having an aperture disposed therein and said securing connection being being releasably engageable with said wheel assembly and positioned adjacent said securing bar to be locked thereto.

3. An anti-theft device as recited in claim 2, wherein said wheel assembly includes a brake assembly having a brake drum wherein in said securing connection means is releasably engaged therewith.

4. An anti-theft device as recited in claim 3, wherein said bifurcated chock means is formed having a substantially U-shaped configuration.

5. An anti-theft device as recited in claim 3, wherein said securing connection means comprises:
    a scissor-like clamp having a pair of blades swingably mounted to each other, said blades includes aligned opens disposed in one end thereof; and
    a pair of jaw members each being oppositely disposed to each other and mounted to respective blades for clamping engagement with said brake drum.

6. An anti-theft device as recited in claim 3, including a lock device arranged to be locked to said securing connection means.

7. An anti-theft device as recited in claim 3, wherein said wheel assembly includes a latching pin arranged to be received in said aperture of said securing bar and, wherein said securing connection means comprises:
    a securing plate having an arcuate notch formed therein to receive said brake drum in a secured manner;
    an ear member laterally extending from said securing plate; and
    a second ear member extending upwardly from said forward main body base in adjacent alignment with said laterally extended ear member.

8. An anti-theft device as recited in claim 3, wherein said main body base includes:
    first and second base sections removably joined to each other, said first section including said vertical securing bar;
    means for removably joining and positioning each base section in a contiguous manner; and wherein said securing connection means comprises:
    a first securing plate extending upwardly from said second base section having an arcuate notch formed therein to removably engage said brake drum;
    a second securing plate extending upwardly from said first base section and arranged to be juxtapositioned with said first plate, said second plate having an arcuate edge with a radius equal to that of the arcuate notch of said first plate; and a securing ear member integrally formed with said second base section arranged to be positioned adjacent said vertical bar of said first base section.

9. An anti-theft device as recited in claim 8, wherein said joining and positioning means comprises:
   a joining pin mounted longitudinally to said first base section and projecting outwardly therefrom; and
   an elongated bore disposed in said second base section and aligned to receive said joining pin.

10. An anti-theft device as recited in claim 4, wherein said securing bar is centrally positioned on said forward main body base member.

11. An anti-theft device as recited in claim 4, wherein said securing bar is positioned adjacent one arm member for engagement with said brake assembly to prevent lateral movement of said chock means.

12. An anti-theft device as recited in claim 7, wherein said bifurcated chock means is formed having a substantially U-shaped configuration.

13. An anti-theft device as recited in claim 12, wherein said device includes a locking device adapted to be secured to said securing connection means.

14. An anti-theft device as recited in claim 5, wherein said laterally extended arms of said chock means include an inclined wall surface to abut the wheels of said wheel assembly to prevent movement of said wheel in a forward or rearward movement.

* * * * *